United States Patent
Deng

(10) Patent No.: US 10,285,478 B2
(45) Date of Patent: May 14, 2019

(54) MULTIFUNCTION WATERPROOF CASE FOR MOBILE TERMINAL

(71) Applicant: Shenzhen Xiao Bei Ke Industrial Co., Ltd, Shenzhen (CN)

(72) Inventor: Lixin Deng, Shaoyang (CN)

(*) Notice: Subject to any disclaimer, the term of this patent is extended or adjusted under 35 U.S.C. 154(b) by 96 days.

(21) Appl. No.: 15/727,620

(22) Filed: Oct. 8, 2017

(65) Prior Publication Data

US 2019/0104818 A1    Apr. 11, 2019

(51) Int. Cl.
*A45C 11/22* (2006.01)
*A45C 11/00* (2006.01)
*H04B 1/38* (2015.01)
*H04B 1/3888* (2015.01)

(52) U.S. Cl.
CPC .............. *A45C 11/00* (2013.01); *A45C 11/22* (2013.01); *A45C 2011/002* (2013.01); *H04B 1/3888* (2013.01); *H04B 2001/3894* (2013.01)

(58) Field of Classification Search
CPC ... A45C 11/00; A45C 11/22; A45C 2011/002; H04B 1/3888; H04B 2001/3894
USPC .................................................. 320/101, 110
See application file for complete search history.

(56) References Cited

U.S. PATENT DOCUMENTS

| 9,510,653 | B2* | 12/2016 | Akin ...................... B23P 15/26 |
| 9,654,179 | B2* | 5/2017 | Shultz .................. H04B 5/0012 |
| 9,799,301 | B2* | 10/2017 | Sahin ...................... G06F 1/163 |
| 10,008,870 | B2* | 6/2018 | Davison ................ H02J 7/0054 |
| 10,153,657 | B1* | 12/2018 | Koifman ................. H02J 7/355 |
| 2014/0020312 | A1* | 1/2014 | Seiling .................... H02S 40/38 52/173.3 |
| 2017/0205854 | A1* | 7/2017 | Zenoff .................... G06F 1/163 |
| 2017/0366217 | A1* | 12/2017 | Bergreen .............. H04M 1/185 |
| 2018/0083663 | A1* | 3/2018 | Yoo ........................... A45F 5/00 |

* cited by examiner

*Primary Examiner* — M Baye Diao
(74) *Attorney, Agent, or Firm* — W&K IP

(57) ABSTRACT

The invention relates to a multi-functional waterproof protective sleeve for a mobile terminal comprising a face cover comprising a screen window and a face cover affixing portion provided in the peripheral edge of the screen window; a middle frame provided with a middle frame affixing portion and a middle frame clamping portion, a rear cover comprising a rear cover body and a rear cover clamping portion adapted to the middle frame clamping portion; a solar charging module, a wireless charging module, a portable power, a control mainboard and a charging plug connected with the control mainboard are provided in order on the side of the rear cover body in the vicinity of middle frame. The invention can obtain waterproof function without using seal ring, and is provided with solar charging module, wireless charging module and portable power, which improve the endurance ability of mobile terminal greatly.

10 Claims, 4 Drawing Sheets

MULTIFUNCTION WATERPROOF CASE FOR MOBILE TERMINAL

TECHNICAL FIELD

The invention relates to a field of waterproof protective sleeve of mobile terminal, especially relates to a multifunctional waterproof protective sleeve for mobile terminal.

BACKGROUND

People in modern life can not live without mobile terminal, especially for those who work busily, they need to use the mobile terminal when swimming, taking bath, in the rain or in the water. It is well-known that the mobile terminal should not be flooded water or touch water, therefore people is unable to use mobile phone when they are in those cases, bringing inconvenience to people.

As the period when people are in those cases is short, and it is impossible for everybody to buy a waterproof mobile terminal to meet such small requirement, or to buy a waterproof protective sleeve of mobile terminal with complicate operation and high price to meet such small requirement, people have to stop using mobile terminal temporarily to endure the inconvenience.

In addition, the endurance ability of the mobile terminal have been making trouble for people.

Therefore the existing technology is urge to be modified and improved.

SUMMARY OF THE INVENTION

In view of the described deficiencies, the objective of present invention is to provide a multi-functional waterproof protective sleeve for mobile terminal, and disclose a protective sleeve for mobile terminal with improved endurance ability and waterproof function.

In order to achieve the above objective, the present invention adopts the following technical solutions:

A multi-functional waterproof protective sleeve for mobile terminal comprising:

a face cover, a middle frame affixed with a side of the face cover, a rear cover hermetically clamped with the middle frame at one side of middle frame which is away from the face cover, and the face cover, middle frame and rear cover define a closed accommodating space for arranging mobile terminal;

The face cover includes a screen window, and a face cover affixing portion provided in the peripheral edge of screen window, by an in-mold cover injection molding process;

The middle frame includes a middle frame affixing portion adapted to the face cover affixing portion, and a middle frame clamping portion provided on the side which is away from the middle frame affixing portion;

The rear cover includes a rear cover body and a rear cover clamping portion which is provided around the rear cover by an in-mold cover injection molding process and matches with the middle frame affixing portion; solar charging module, wireless charging module, portable power and control mainboard are provided in order at one side of the rear cover body in the vicinity of the middle frame, and a transparent window is provided at the place that on the rear cover body corresponding to the solar charging module.

The control mainboard connects with the solar charging module, wireless charging module, portable power respectively, and includes a charging plug connected with a charging port of mobile terminal, the control mainboard is provided with a first charging mode charging for mobile terminal, and a second charging mode charging for portable power in advance.

Preferably, a through hole is provided on the screen window corresponding to where the fingerprint recognition of mobile terminal is, and a fingerprint recognition flexible film is airtightly affixed to the through hole.

Preferably, the face frame affixing portion is provided with a plurality of first holding blockings at the peripheral edge of a side in the vicinity of middle frame.

Preferably, the middle frame is provided with a plurality of buttons at a position corresponding to functional keys on the side surface of the mobile terminal; the middle frame is provided with an opening respectively each at the position corresponding to mobile terminal charging port and earphone jack respectively, and inside the opening is provided with a soft rubber stopper by interference fit.

Preferably, the middle frame affixed portion is opened with a plurality of holding grooves interlacing adapted to the first holding blocking, and is provided with second holding blocks inside the middle frame and parallel to the holding grooves;

Preferably, the middle frame clamping portion includes a first bone position and a second bone position, the first bone position is in back-off shape.

Preferably, the rear cover clamping portion is provided with a camera hole at a position corresponding to mobile terminal camera, and the camera hole is airtightly affixed with a camera lens.

Preferably, the rear clamping portion includes a clamping groove adapted to the first bone position and the second bone position.

Preferably, the first charging mode sets up a first charging prior unit, including: a directly charging priority Level 1 which charges for mobile terminal by using wireless charging module, a directly charging priority Level 2 which charges for mobile terminal by using portable power, and directly charging priority Level 3 which charges for mobile terminal by using solar charging module;

The second charging mode sets up a second charging prior unit, including: an indirectly charging priority Level 1 which charges for mobile terminal by using wireless charging module, an indirectly charging priority Level 2 which charges for mobile terminal by using solar charging module;

Preferably, the control mainboard is provided with an adjusting switch for switching between the first charging mode and the second charging mode.

Compared with the prior art, the multi-functional waterproof protective sleeve for mobile terminal terminal provided in the present invention includes the face cover, the middle frame and the rear cover, the face cover affixing portion and the middle frame affixing portion are airtightly affixed by waterproof sealant, and rear cover clamping portion and middle affixing portion are in interferential fit and airtightly connect with each other, so as to achieve the objective of all-dimensionally waterproof. Besides, a fingerprint recognition flexible film is provided on the face cover, and a plurality of buttons and openings are provided on the middle frame (openings are sealed by soft rubber stopper when they are not in use), and a camera lens is provided at the camera position of the rear cover, achieving no influence to use the mobile terminal by user in the case the mobile terminal is waterproof all-dimensionally; moreover, the invention is provided with solar charging module, wireless charging module and portable power, which improves the endurance ability of mobile terminal greatly.

DETAILED DESCRIPTION OF THE EMBODIMENTS

To make the objective, technical solution and effects of the invention more clear and explicit, the invention will be described in detail with reference to the accompanying drawings and preferred embodiments. It is to be understood that the described detailed embodiments are only used to explain the invention and but not intended to limit the invention.

Figure 1:
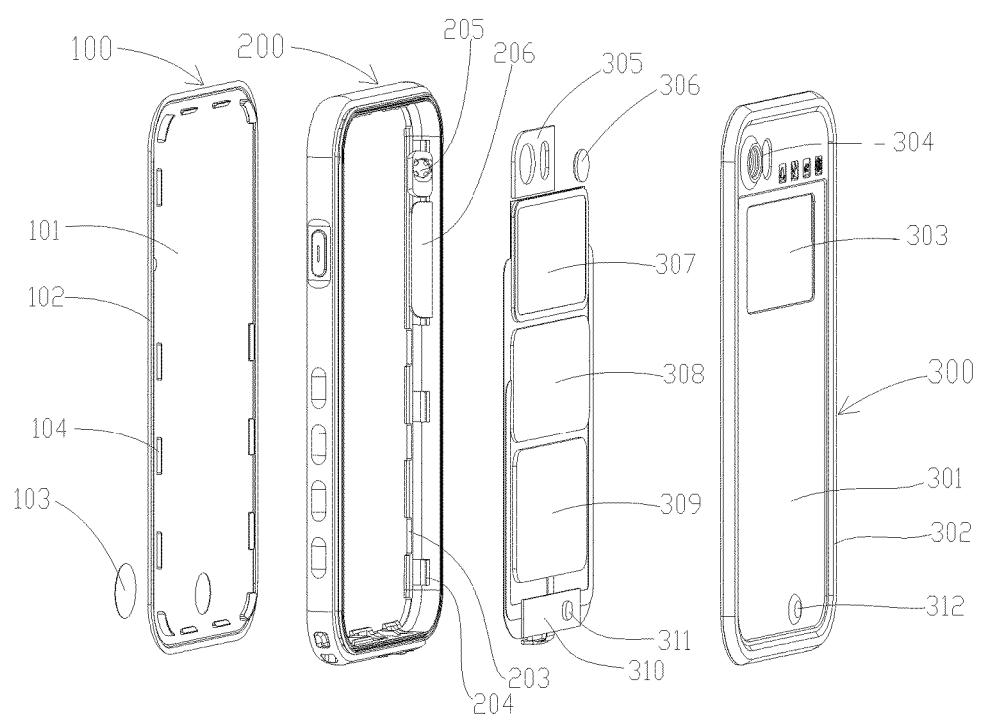
FIG. 1 is an exploded schematic view of a preferred embodiment of a multi-functional waterproof protective sleeve for mobile terminal in the present invention.
Figure 2:
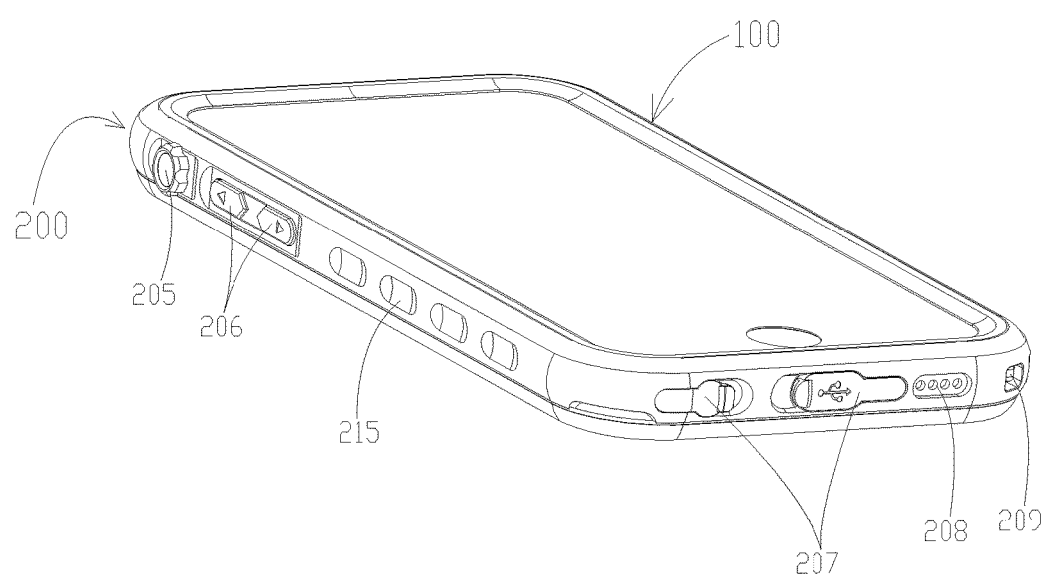
FIG. 2 is a perspective view of the preferred embodiment of the multi-functional waterproof protective sleeve for mobile terminal in the present invention.
Figure 3:
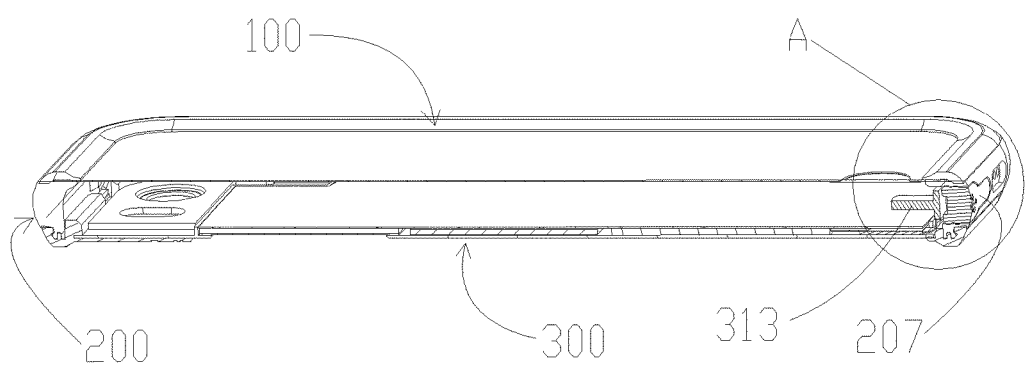
FIG. 3 is a sectional view of the preferred embodiment of the multi-functional waterproof protective sleeve for mobile terminal in the present invention.
Figure 4:
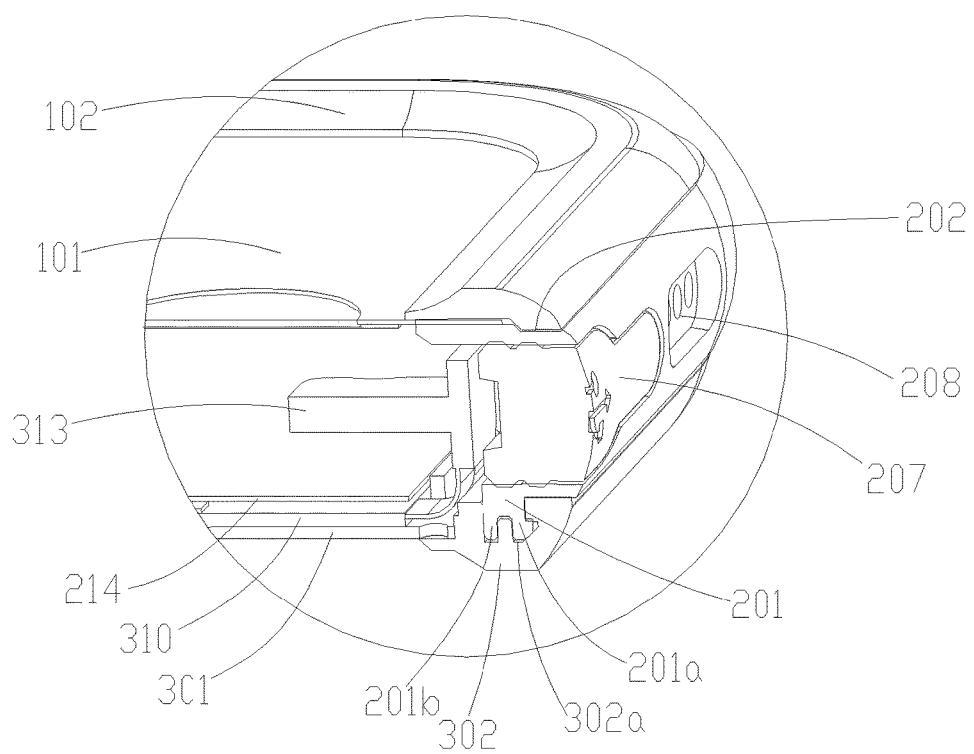
FIG. 4 is an enlarged schematic view of FIG. 3A of the preferred embodiment of the multi-functional waterproof protective sleeve for mobile terminal in the present invention.

As shown in FIGS. 1-4, the invention provides a multi-functional waterproof protective sleeve for mobile terminal including:

a face cover 100, a middle frame 200 affixed with a side of the face cover 100, the middle frame 200 is airtightly clamped with a rear cover 300 at a side of middle frame 200 away from the face cover 100; and the face cover 100, middle frame 200 and rear cover 300 define a closed accommodating space for arranging the mobile terminal.

In the embodiment of the present invention, the face cover 100 is tightly affixed with the middle frame 200 by waterproof sealant, and the rear cover 300 connects with middle frame 200 by interferential fit to each other, so as to achieve the objective of waterproof.

Further, the face cover 100 includes a screen window 101, and a face cover affixing portion 102 provided in the peripheral edge of a side of the screen window 101 by an in-mold cover injection molding process;

The middle frame 200 includes a middle frame affixing portion 202 adapted to the face cover affixing portion 102, and a middle frame clamping portion 201 provided on the side away from the middle frame affixed portion 202;

The rear cover 300 includes a rear cover body 301 and a rear cover clamping portion 302 which is provided in the peripheral edge of the rear cover body 301 by an in-mold cover injection molding process and matches with the middle frame affixed portion 201.

In the embodiment of the present invention, a through hole is provided on the screen window 101 corresponding to where the fingerprint recognition of mobile terminal is, and a fingerprint recognition flexible film 103 is tightly affixed to the through hole. So the present invention can achieve waterproof effects without influencing the user to use fingerprint recognition key. Furthermore, as the screen window 101 of the present invention is transparent TPU lens, which will not affect the usage of touching screen of user, but can allow the front-facing camera work without difficulty. It is no need to set a sound outlet at the telephone receiver, the sound from the telephone receiver can penetrate to outside from the transparent TPU lens.

Preferably, a plurality of first holding blockings 104 are provided in the peripheral edge of a side of face frame affixing portion 102 which is in the vicinity of middle frame 200.

Preferably, the middle frame affixed portion 202 is opened with a plurality of holding grooves 203 interlacing adapted to first holding blockings 104, and provided with second holding blocks 204 inside the middle frame 200 and parallel to the holding grooves 203;

In the embodiment of the present invention, when face cover affixing portion 102 has affixed with the middle frame affixing portion 202, and the first holding block 104 is interposed in holding groove 203 so as to to form a U shape with the second holding block 204. The U shape matches with the side wall of mobile terminal so as to form holding and positioning for the mobile terminal. Furthermore, the described structure can also achieve the effect of quakeproof.

The middle frame 200 is provided with a plurality of buttons 206 at the position corresponding to functional key of the mobile terminal; the middle frame 200 is provided with an opening respectively each at the position corresponding to charging port of mobile terminal and earphone jack respectively, and inside the opening is provided with a soft rubber stopper 207 by interference fit.

In the present embodiment of the present invention, an elastic sticking film (see 206 of FIG. 1 for detail) is further provided on the bottom of button 206, the sticking film is fixed to inside wall of middle frame 200, so as to be waterproof on the position of button 206 without influencing the pressing sensation of button 206. Openings provided on charging port of mobile terminal and earphone jack allow user to use the functions thereof, when the openings are not in use, the soft rubber stopper 207 can be interposed in the openings to achieve the objective of waterproof.

A camera hole 304 is provided on the rear cover clamping portion 302 at the position corresponding to mobile terminal camera, and the camera hole 304 is airtightly affixed with a camera lens 306.

In the embodiment of the present invention, a gasket 305 is provided between mobile terminal camera and camera hole 304.

The middle frame clamping portion 201 includes a first bone position 201a and a second bone position 201b, the first bone position 201a is in back-off shape The rear cover clamping portion 302 includes a clamping groove 302a adapted to the first bone position 201a and the second bone position 201b.

In the embodiment of the present invention, the rear cover 300 is made of TPU soft rubber material, and middle frame 200 is made of rigid rubber material, thereby the rear cover clamping portion 302 can form elastic wrapping to the middle frame clamping portion 201, and when the first bone position 201a, the second bone position 201b are clamped with clamping groove 302a, they form 10 waterproof faces (see FIG. 4 for detail) which improves the waterproof ability greatly without using sealing ring.

Furthermore, a rotating button 205 is provided on the side wall of the middle frame 200 at the position corresponding to mobile terminal dialing key. A clamping spring plastic part is provided at one end of the rotating button 205, and a sealing ring is provided between the clamping spring plastic part and the middle frame 200 to achieve waterproof.

Operation of mute key of mobile terminal can be realized by rotating the rotating button 205 clockwise or counterclockwise.

Antiskid grooves 215 are provided on the place corresponding to two side walls of middle frame 200. When user is gripping the waterproof protective sleeve for mobile terminal, antiskid grooves 215 achieves antiskid effect.

Besides, a hanging hole 209 is provided at a turning corner of middle frame 200, and user can use a hanging rope to thread through the hanging hole 209, which make it easy to carry.

A plurality of sound outlets 208 are provided on the middle frame 200 at the position corresponding to loudspeaker sound outlet and microphone of the mobile terminal. Below the sound outlets 208, that is, on the inside wall of middle frame 200, a waterproof gasket is affixed, thereby it will not affect the usage of loudspeaker sound outlet and microphone of mobile terminal, but achieve the waterproof effect.

Further, solar charging module 307, wireless charging module 308, portable power 309 and control mainboard 310 are provided in order on one side of the rear cover body 301 in the vicinity of the middle frame 200, and a transparent window 303 is provided on the rear cover body 301 at the position corresponding to the solar charging module 307.

The control mainboard 310 connects with the solar charging module 307, wireless charging module 308, portable power 309 respectively, and includes a charging plug 313 connected with a charging port of the mobile terminal, the control mainboard 310 is preset with a first charging mode charging for mobile terminal, and a second charging mode charging for portable power.

The first charging mode sets up a first charging prior unit, including: a directly charging priority Level 1 which charges for mobile terminal by using wireless charging module, a directly charging priority Level 2 which charges for mobile terminal by using portable power, and a directly charging priority Level 3 which charges for mobile terminal by using solar charging module 307;

The second charging mode sets up a second charging prior unit including an indirectly charging priority Level 1 which charges for mobile terminal by using wireless charging module, an indirectly charging priority Level 2 which charges for mobile terminal by using solar charging module;

In the present embodiment of the present invention, the control mainboard 310 is provided with an adjusting switch 311 for switching between the first charging mode and the second charging mode.

When switched to the first charging mode by adjusting switch 311, only charging for mobile terminal is allowed (not charge for portable power); the control mainboard 310 determines whether the directly charging priority level 1 can charge for mobile terminal according to the set first charging prior unit, if the answer is yes, then charge for mobile terminal by using wireless charging module, and directly charging priority level 2 and directly charging priority level 3 are cut off, and do not charge for mobile terminal. If the answer is no, continue to determine whether directly charging priority level 2 can charge for mobile terminal, if the answer is yes, charge for mobile terminal by using portable power, and directly charging priority level 1 and directly charging priority level 3 are cut off, and do not charge for mobile terminal. By that analogy, the first charging mode and the second charging mode work in an above described way.

In conclusion, the present invention discloses a multi-functional waterproof protective sleeve for mobile terminal including: a front cover including a screen window and a face cover affixing portion provided around the screen window; a middle frame provided with middle frame fitting portion and middle frame clamping portion, rear cover including rear cover body and rear cover clamping portion adapted to the middle frame clamping portion; solar charging module, wireless charging module, portable power, control mainboard and charge plug connected with control mainboard are provided in order on the side of the rear cover body in the vicinity of middle frame; the control mainboard connects with solar charging module, wireless charging module, portable power respectively, and provided with a first charge mode charging for mobile terminal, and a second charge mode charging for portable power. The invention can achieve waterproof function without using seal ring, and are equipped with solar charging module, wireless charging module and portable power, which improve the endurance ability of mobile terminal greatly.

It is to be understood that, the skilled in the art can make variations and substitutes according to the technical solution and the conception of the present invention, and those variations and substitutes all fall in the appended claims of the present invention.

I claim:

1. A multi-functional waterproof protective sleeve for mobile terminal comprising:
a face cover, a middle frame affixed with a side of the face cover, a rear cover tightly clamped with the middle frame at a side of middle frame away from the face cover, the face cover, middle frame and rear cover define a closed accommodating space for arranging mobile terminal;
the face cover comprises a screen window, and a face cover affixing portion provided in the peripheral edge of screen window by an in-mold cover injection molding process;
the middle frame comprises a middle frame affixing portion adapted to the face cover affixing portion, and a middle frame clamping portion provided on a side away from the middle frame affixing portion;
the rear cover comprises a rear cover body and a rear cover clamping portion which is provided around the rear cover body through an in-mold cover injection molding process and adapts to the middle frame clamping portion; a solar charging module, a wireless charging module, a portable power and a control mainboard are provided in order on a side of the rear cover body near the middle frame, a transparent window is provided on the rear cover body at a position corresponding to the solar charging module;
the control mainboard connects with the solar charging module, wireless charging module, portable power respectively, and comprises a charging plug connected with a charging port of the mobile terminal, the control mainboard is preset with a first charging mode for charging for mobile terminal, and a second charging mode for charging for portable power in advance.

2. The multi-functional waterproof protective sleeve for mobile terminal of claim 1, wherein a through hole is provided on the screen window corresponding to where a fingerprint recognition of mobile terminal is, and a fingerprint recognition flexible film is tightly affixed to the through hole.

3. The multi-functional waterproof protective sleeve for mobile terminal of claim 1, wherein a plurality of first holding blockings are provided at the peripheral edge of a side of face frame affixing portion near the middle frame.

4. The multi-functional waterproof protective sleeve for mobile terminal of claim 1, wherein the middle frame is provided with a plurality of buttons at a position corresponding to functional keys on a side surface of the mobile terminal; the middle frame is provided with an opening respectively each at positions corresponding to a charging port and an earphone jack of the mobile terminal respectively, and inside the opening is provided with a soft rubber stopper by interference fit.

5. The multi-functional waterproof protective sleeve for mobile terminal of claim 3, wherein the middle frame affixed portion is opened with a plurality of holding grooves interlacing adapted to the first holding blocking, and is provided with second holding blocks inside the middle frame and parallel to the holding grooves.

6. The multi-functional waterproof protective sleeve for mobile terminal of claim 1, wherein the middle frame clamping portion comprises a first bone position and a second bone position, the first bone position is in back-off shape.

7. The multi-functional waterproof protective sleeve for mobile terminal of claim 1, wherein the rear cover clamping portion is provided with a camera hole at a position corresponding to a camera of the mobile terminal, and the camera hole is airtightly affixed with a camera lens.

8. The multi-functional waterproof protective sleeve for mobile terminal of claim 1, wherein the rear clamping portion comprises a clamping groove adapted to the first bone position and the second bone position.

9. The multi-functional waterproof protective sleeve for mobile terminal of claim 1, wherein the first charging mode sets up a first charging prior unit, including: a directly charging priority Level 1 which charges for mobile terminal by using wireless charging module, a directly charging priority Level 2 which charges for mobile terminal by using portable power, and directly charging priority Level 3 which charges for mobile terminal by using solar charging module;

the second charging mode sets up a second charging prior unit, including: an indirectly charging priority Level 1 which charges for mobile terminal by using wireless charging module, an indirectly charging priority Level 2 which charges for mobile terminal by using solar charging module.

10. The multi-functional waterproof protective sleeve for mobile terminal of claim 1, wherein the control mainboard is provided with an adjusting switch for switching between the first charging mode and the second charging mode.

* * * * *